(12) United States Patent
Mizukura et al.

(10) Patent No.: US 7,583,303 B2
(45) Date of Patent: Sep. 1, 2009

(54) IMAGING DEVICE ELEMENT

(75) Inventors: Takami Mizukura, Kanagawa (JP); Naoya Katoh, Chiba (JP); Kenji Tanaka, Tokyo (JP); Masaya Kinoshita, Kanagawa (JP); Yutaka Yoneda, Kanagawa (JP); Akira Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 10/589,492

(22) PCT Filed: Jan. 12, 2006

(86) PCT No.: PCT/JP2006/300674

§ 371 (c)(1),
(2), (4) Date: Aug. 15, 2006

(87) PCT Pub. No.: WO2006/080220

PCT Pub. Date: Aug. 3, 2006

(65) Prior Publication Data

US 2008/0225135 A1    Sep. 18, 2008

(30) Foreign Application Priority Data

Jan. 31, 2005    (JP)    ............................. 2005-022853

(51) Int. Cl.
*H04N 5/232*    (2006.01)
*H04N 9/04*    (2006.01)

(52) U.S. Cl. .................. 348/266; 348/268; 348/271; 348/272; 348/273; 348/277; 348/278

(58) Field of Classification Search ................ 348/271, 348/277, 278, 223.1; 358/512

See application file for complete search history.

(56) References Cited

U.S. PATENT DOCUMENTS 4,833,527 A * 5/1989 Kondo ........................ 348/675

(Continued)

FOREIGN PATENT DOCUMENTS

JP    2000-315784    11/2000

(Continued)

*Primary Examiner*—David L Ometz
*Assistant Examiner*—Dwight Alex C Tejano
(74) *Attorney, Agent, or Firm*—Oblon, Spivak, McClelland, Maier & Neustadt, P.C.

(57) ABSTRACT

An imaging device having a hybrid RGBYC color filter using a primary color system RGB filter and a complementary color system YC filter is composed. Four G filters that directly relate to resolution and that is close to a luminance signal that human eyes sense are arrayed in a checker shape so that the number of the G filters is four times larger than the number of filters of each of the other colors. An array shown in FIG. 10A is composed of low resolution rows (G, R, G, and B) and high resolution rows (C, G, Y, and G) that are alternately arrayed in each line. When signals are read if exposure times are varied for individual lines, the signals that are read can easily have a wide dynamic range. An array shown in FIG. 10B has two Gs, a low sensitivity color, and a high sensitivity color in each line and each row. Thus, the luminance difference is small in the horizontal direction and the vertical direction. Thus, the reading method in the array shown in FIG. 10B is slightly complicated than that in the array shown in FIG. 10A. However, since the special interpolation characteristic of the array shown in FIG. 10B is advantageous, a smooth gradation can be easily represented.

6 Claims, 19 Drawing Sheets

U.S. PATENT DOCUMENTS

| | | | |
|---|---|---|---|
| 4,887,252 A | 12/1989 | Miyakawa et al. | |
| 4,907,074 A * | 3/1990 | Hashimoto | 348/237 |
| 5,202,756 A | 4/1993 | Sasaki et al. | |
| 5,280,347 A * | 1/1994 | Shiraishi et al. | 348/223.1 |
| 5,568,193 A * | 10/1996 | Kawahara | 348/222.1 |
| 5,889,554 A * | 3/1999 | Mutze | 348/273 |
| 6,434,268 B1 * | 8/2002 | Asamura et al. | 382/162 |
| 6,559,886 B1 | 5/2003 | Miyahara | |
| 7,057,654 B2 * | 6/2006 | Roddy et al. | 348/277 |
| 7,148,925 B2 * | 12/2006 | Osada et al. | 348/275 |
| 7,418,129 B2 * | 8/2008 | Komori | 382/162 |
| 2003/0215132 A1 * | 11/2003 | Kagawa et al. | 382/162 |
| 2004/0174389 A1 * | 9/2004 | Ben-David et al. | 345/694 |
| 2004/0227824 A1 | 11/2004 | Takahashi | |
| 2006/0038953 A1 * | 2/2006 | Moriya | 349/144 |
| 2007/0132864 A1 * | 6/2007 | Tsuruoka | 348/241 |

FOREIGN PATENT DOCUMENTS

| | | |
|---|---|---|
| JP | 2001-359114 | 12/2001 |
| JP | 2001-359114 | 12/2004 |

* cited by examiner

Fig. 8
RELATED ART

| C | Y | C | Y |
|---|---|---|---|
| G | M | G | M |
| C | Y | C | Y |
| M | G | M | G |

Fig. 10A

| G | R | G | B |
|---|---|---|---|
| C | G | Y | G |
| G | B | G | R |
| Y | G | C | G |

Fig. 10B

| G | R | G | C |
|---|---|---|---|
| B | G | Y | G |
| G | C | G | R |
| Y | G | B | G |

IMAGING DEVICE ELEMENT

TECHNICAL FIELD

The present invention relates to an imaging apparatus and an imaging device.

BACKGROUND ART

In recent years, the number of pixels of an imaging device used in an image inputting apparatus has been remarkably increased. The resolution of the imaging device has been improved to the level of a smooth granularity that human eyes cannot recognize. Under such circumstances, requirements for picture quality have been changed from higher resolution to higher color reproducibility, higher noise reduction, and wider dynamic range. The present invention provides a means and an apparatus that can increase a luminance dynamic range they scan while maintaining picture quality, in particular, color reproducibility and noise characteristic in their allowable levels.

An image processing apparatus that can more faithfully reproduce colors and reduce noise than before is disclosed in Patent Document 1 (Japanese Patent Application Unexamined Publication No. 2003-284084).

Next, the apparatus disclosed in Patent Document 1 will be described. A four-color filter 1 having an array of colors shown in FIG. 1 is disposed on the front of an imaging device. As denoted by dotted lines, the color filter 1 has a structure of four-color units each of which is the minimum unit composed of an R filter that transmits only red (R) light, a B filter that transmits only blue (B) light, a G1 filter that transmits only green light of a first wavelength band, and a G2 filter that transmits only green light of a second wavelength band.

FIG. 2A and FIG. 2B show an example of a structure of a signal processing section that performs a signal process for an image signal captured by an imaging device for example a CCD which has the color filter 1. Because of the limited drawing space, the structure of the signal processing section is shown in two portions of FIG. 2A and FIG. 2B. Reference numeral 10 denotes a frontend to which four types of color signals (R signal, G1 signal, G2 signal, and B signal) are input from an image sensor. The frontend 10 performs a correlated double sampling process, a gain controlling process, a digital transforming process, and so forth for the color signals supplied from the image sensor. The correlated double sampling process is performed to remove noise components which are output from the color signals. Image data which are output from the frontend 10 are supplied to a signal processing section 11 composed of an LSI (Large Scale Integrated Circuit).

The signal processing section 11 is connected to a microcomputer (not shown) through a microcomputer interface 12. The microcomputer controls the whole operations of for example a digital still camera according to a predetermined program. In addition, the microcomputer controls each block that composes the signal processing section 11 through the microcomputer interface 12.

The signal processing section 11 performs an interpolating process, a filtering process, a matrix calculating process, a luminance signal generating process, a color difference signal generating process, and so forth for four types of color signals which are input from the frontend 10. The frontend 10 generates a picture signal. The picture signal is supplied to a display unit (not shown). The display unit displays the imaged picture. In addition, picture data which are output from the signal processing section 11 are compressed and stored to an internal storage medium, an external storing medium, or the like.

Next, each block of the signal processing section 11 will be described. An offset compensation processing section 21 removes a noise component (offset component) from the picture signal supplied from the frontend 10. The picture signal supplied from the offset compensation processing section 21 is output to a white balance compensation processing section 22. The white balance compensation processing section 22 compensates a white balance of the picture signal. In other words, the white balance compensation processing section 22 compensates unbalanced colors due to the difference of color temperatures of an object and the difference of the sensitivities of the color filters (R, G1, G2, and B) of the sensor.

An output of the white balance compensation processing section 22 is supplied to a vertical direction synchronization processing section 23. The vertical direction synchronization processing section 23 synchronizes picture data that chronologically differ in the vertical direction using a delaying device for example a small capacity memory so as to perform a vertical direction interpolating process and a vertical direction filtering process for the picture data.

A plurality of picture signals synchronized by the vertical direction synchronization processing section 23 are supplied to a processing section 24 for an interpolating process, a filtering process, a high frequency compensating process, and a noise process. The processing section 24 performs an interpolating process for interpolating color signals of 2×2 pixels, which is the minimum unit of the color filters (R, G1, G2, B), with phases in the same space, a filtering process for properly limiting a signal bandwidth, a high frequency compensating process for compensating a high frequency component of the signal bandwidth, a noise process for removing noise components from the signals, and other processes.

Picture signals for example signals of four colors of RG1G2B obtained by the processing section 24 are supplied to a linear matrix processing section 25. The linear matrix processing section 25 performs matrix calculations for four inputs and three outputs. When matrix coefficients of a 3×4 matrix are given, RGB color outputs can be obtained from picture information of four colors of RG1G2B.

RGB outputs of the linear matrix processing section 25 are supplied to gamma compensation processing sections 26R, 26G, and 26B, respectively. The gamma compensation processing sections 26R, 26G, and 26B inversely compensate nonlinear characteristics of the display unit and finally accomplish linear characteristics.

Output signals of the gamma compensation processing sections 26R, 26G, and 26B are supplied to each of a luminance (Y) signal generation processing section 27 and a color difference (C) signal generation processing section 28. The luminance (Y) signal generation processing section 27 combines gamma-compensated RGB signals with predetermined combining ratios and generates a luminance signal. The color difference signal generation processing section 28 combines the gamma-compensated RGB signals with predetermined combining ratios and generates a color different signal.

The color difference signal generated by the color difference signal generation processing section 28 is supplied to a bandwidth limitation and thin-out processing section 29. The bandwidth limitation and thin-out processing section 29 generates a color difference signal of which color difference signals Cb and Cr have been time-division multiplexed. Thus, it can be said that the image processing apparatus using the four-color filter is superior to that using the three-primary-color filter in color reproducibility.

Generally, it is preferred that as spectral sensitivity the imaging device have high color reproducibility and good noise characteristic. "Good color reproducibility" means that the imaging device can sense the same colors as human eyes can or the difference between colors that the imaging device can sense and the human eyes can see is small. What the human eyes can see means that colors that they can see. "Good noise characteristic" means that the noise amount in a particular luminance level is small. Noise is largely categorized as luminance noise and color noise. The luminance noise depends on the absolute sensitivity of the imaging device. In contrast, the color noise largely depends on the relationship between spectrum sensitivities of color filters of the imaging device, namely the shape of a spectral sensitivity curve.

A method of matrix-transforming output signals of an imaging device which are linearly proportional to the luminance and generating primary color RGB signal values is often used in a signal process of a conventional image inputting apparatus shown in FIG. 2A and FIG. 2B. This process is referred to as the linear matrix process. In many cases, since an input image of an image inputting apparatus (for example, a scanner or a digital camera) is observed and edited on a monitor of a personal computer (hereinafter sometimes referred to as the PC), the target color space of primary color RGB signal values that have been matrix-calculated is designated to an sRGB color space, which is the color space of the PC monitor.

IEC (International Electrotechnical Commission) has defined the sRGB color space as a standard multimedia color space on the basis that color image signals should be transmitted. When the transmission side transmits a color image and the reception side receives it on the basis of the standard color space, they can share the same color reproduction.

Thus, the target spectral sensitivity (referred to as the relative sensitivity in the drawings) of the imaging device is an sRGB color matching function of which a color matching function (refer to FIG. 3), which is the spectral sensitivity of human eyes, is linearly transformed by a 709 type matrix. For details of the 709 type matrix, refer to Reference Document 1 ("ITU-R BT. 709-3, "Basic Parameter Values for the HDTV standard for the Studio and for International Programme Exchange" (1998)").

In FIG. 3, a curve 31x denotes a function x(λ), a curve 31y denotes a function y(λ), and a curve 31z denotes a function z(λ). The graph of the color matching function shown in FIG. 3 is defined as the CIE (Commission International de l'Eclairage) 1931.

FIG. 4 is a graph showing the sRGB color matching function. In FIG. 4, a curve 32r denotes a function r(λ), a curve 32g denotes a function g(λ), and a curve 32b denotes a function b(λ). Since the sRGB color matching function satisfies a router condition, the imaging device can sense colors that the human eyes can see. For details of the router condition, refer to Reference Document 2 (Noboru Ohta, "Engineering on Chromatics (translated title)", ISBN 4-501-61350-5, Tokyo Denki-Daigaku Publishing Office (1993)).

However, since the spectral sensitivity shown in FIG. 4 contains a negative component, it is practically impossible to produce a three-color RGB filter having such spectral sensitivity. If a three-color RGB filter that has positive spectral sensitivity and satisfies the router condition, the filter has spectral sensitivity as shown in FIG. 5. In FIG. 5, a curve 33R denotes a function sR(λ), a curve 33G denotes a function sG(λ), and a curve 33B denotes an sB(λ).

As is clear from FIG. 5, the curve 33R of the spectral sensitivity of the red component filter of the imaging device largely matches the curve 33G of the spectral sensitivity of the green component filter. This means that two component signals are very similar. Thus, when three colors of the sRGB space as target output signals of the imaging device using the filters having the spectral sensitivities shown in FIG. 5 are calculated, matrix calculations given by formula (1) are required.

$$\begin{pmatrix} \bar{r}(\lambda) \\ \bar{g}(\lambda) \\ \bar{b}(\lambda) \end{pmatrix} = \begin{pmatrix} 6.5614 & -5.5412 & 0.1845 \\ -2.0049 & 3.1163 & -0.1635 \\ 0.1182 & -0.2783 & 1.0688 \end{pmatrix} \cdot \begin{pmatrix} S_R(\lambda) \\ S_G(\lambda) \\ S_B(\lambda) \end{pmatrix} \quad (1)$$

As is clear from the matrix coefficients of formula (1), to calculate the red component of the output signals, the red component and the green component of the input signals are multiplied by very large matrix coefficients of 6.5614 and −5.5412. This means that noise of the red signal and the green signal of the imaging device is much increased.

Thus, a three-color RGB filter that does not perfectly satisfy the router condition, namely that has good noise characteristic with sacrifice of color reproducibility to some extent, but that has spectral sensitivity as shown in FIG. 6 is used. In FIG. 6, a curve 34R denotes a function s1R(λ), a curve 34G denotes a function s1(G), and a curve 34B denotes a function s1B(λ). Since the spectral sensitivity shown in FIG. 6 does not satisfy the router condition, the spectral sensitivity of the three-color filter shown in FIG. 6 cannot be linearly transformed into the sRGB color matching function. Thus, approximately transformed matrix calculations for the sRGB color matching function is given by formula (2).

$$\begin{pmatrix} \hat{r}(\lambda) \\ \hat{g}(\lambda) \\ \hat{b}(\lambda) \end{pmatrix} = \begin{pmatrix} 2.250 & -0.649 & -0.089 \\ -0.057 & 1.574 & -0.384 \\ -0.009 & -0.444 & 1.567 \end{pmatrix} \cdot \begin{pmatrix} s1_R(\lambda) \\ s1_G(\lambda) \\ s1_B(\lambda) \end{pmatrix} \quad (2)$$

The absolute values of all the matrix coefficients given by formula (2) are smaller than those given by formula (1). Thus, it is clear that when colors are separated, noise is not relatively increased.

Because of the foregoing reason, it is known that the typical primary color system RGB imaging device has spectral sensitivity denoted by a curve as shown in FIG. 6 and has excellent color reproducibility and noise characteristic. However, the imaging device actually has spectral sensitivity denoted by a curve as shown in FIG. 7 because of the influences of the sensitivity of the imaging device itself, the characteristics of a lens, and the characteristics of an infrared cut filter. In FIG. 7, a curve 35R denotes spectral sensitivity of an R filter, a curve 35G denotes spectral sensitivity of a G filter, and a curve 35B denotes spectral sensitivity of a B filter.

Due to various restrictions in production of color filters, it is difficult to improve their spectral sensitivities. To maintain their spectral sensitivities, for example the cell size may be increased or an electric gain may be applied. However, if the cell size is increased, improvement of resolution is sacrificed. If the gain is applied, noise reduction is sacrificed.

As a result, although the primary color system RGB imaging device has excellent color reproducibility, it can be more improved. In addition, although the primary color system RGB imaging device has low color separation noise, luminance noise as a dominant component of noise tends to increase due to low sensitivity. In other words, although the primary color system RGB imaging device has excellent color reproducibility, it tends to have large noise.

A complementary color system color filter is also known as a color filter. An complementarily checkered line sequence type color filter of which four color filters of for example Y (yellow), C (cyan), M (magenta), and G (green) are arrayed as shown in FIG. 8 is known. In FIG. 8, a matrix of 2×4 denoted by dotted lines is the minimum unit.

FIG. 9 is a graph showing spectral sensitivity of the complementary color system YCMG imaging device. In FIG. 9, a curve 36Y denotes spectral sensitivity of a Y filter, a curve 36C denotes spectral sensitivity of a C filter, a curve 36M denotes spectral sensitivity of an M filter, and a curve 36G denotes spectral sensitivity of a G filter. As shown in FIG. 9, since the sensitivity of each color filter is high, the complementary color system YCMG imaging device advantageously images an object at a dirk place and has excellent luminance noise characteristic. However, since spectral sensitivities of the color filters largely overlap, if the color reproducibility of the imaging device is improved, very large color separation coefficients are required. As a result, color separation noise increases. Thus, the color reproducibility of the complementary color system YCMG imaging device cannot be improved in comparison with that of the primary color system RGB imaging device.

Thus, there is much room for improving the color reproducibility of the complementary color system YCMG imaging device. In contrast, the complementary color system YCMG imaging device has large color separation noise. However, since the sensitivity of the complementary color system YCMG imaging device is high, luminance noise which is a dominant component of noise of the complementary color system YCMG imaging device tends to decrease. In other words, the complementary color system YCMG imaging device has sufficient noise characteristic and insufficient color reproducibility.

As described above, when the conventional primary color system RGB imaging device is used, luminance noise becomes large due to low sensitivity. In contrast, when the conventional complementary color system YCMG imaging device is used, color reproducibility and color separation noise characteristic are insufficient.

Therefore, an object of the present invention is to provide an imaging apparatus and an imaging device that can solve the problems of the forgoing imaging devices.

DISCLOSURE OF THE INVENTION

To solve the foregoing problem, the present invention is an imaging apparatus having an imaging section; an image inputting section composed of a frontend; and a signal processing section which processes a plurality of image signals supplied from the image inputting section and generates three primary color signals, wherein the imaging section has a three primary color system color separation filter, a complementary color system color separation filter, and an imaging device to which color lights separated by the color separation filters are input, wherein the signal processing section performs a matrix calculating process for the plurality of signals obtained by the three primary color system color separation filter and the complementary color system color separation filter and generates three primary color signals in a first region of which input image data are in a low/middle luminance level, and wherein the signal processing section performs a matrix calculating process for three primary color signals obtained by the three primary color system color separation filter and generates three primary color signals in a second region of which the input image data are in a high luminance level.

In addition, the present invention is an imaging device composed of a total of five color filters of three primary color filters of R (red), G (green), and B (blue) of a primary color system and two color filters of Y (yellow) and C (cyan) of a complementary system, wherein G filters having a luminance characteristic similar to human eyes are arrayed in a checker shape so that space information of green is obtained four times larger than that of each of the other colors.

According to the present invention, since color filters of five colors of primary color system RGB and complementary color system YC are combined for an imaging device, color reproducibility can be improved and color separation noise can be decreased. In addition, output signals of colors filers of five colors of RGBYC are selected corresponding to a luminance level, an imaging device having higher color reproducibility and higher sensitivity, namely lower noise, than those of a primary color system imaging device or a complementary color system imaging device can be accomplished. As a result, a scene having a wide dynamic range can be captured.

BRIEF DESCRIPTION OF DRAWINGS

Figure 8:
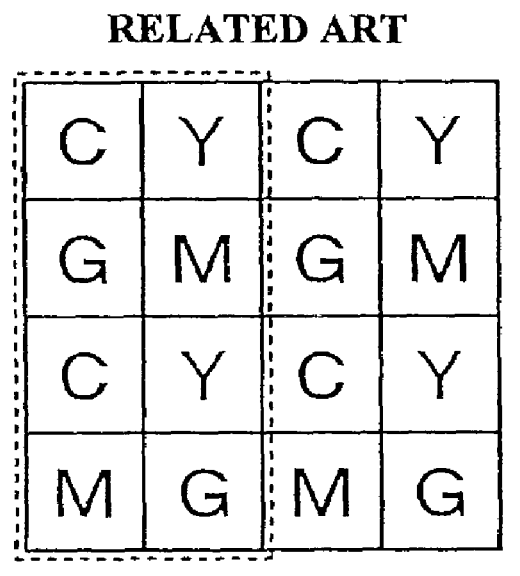

FIG. 8 is a schematic diagram showing an array of colors of a color filter of a complementary color system YCMG imaging device.

FIG. 10A and FIG. 10B are schematic diagrams showing an array of colors of the hybrid RGBYC imaging device.

BEST MODES FOR CARRYING OUT THE INVENTION

According to the present invention, an imaging device has a hybrid RGBYC color filter composed of a primary color system RGB filter and a complementary color system YC filter. Various types of arrays of colors may be used for the hybrid RGBYC color filter. In this example, color filters shown in FIG. 10A and FIG. 10B are used. In FIG. 10A and FIG. 10B, RGB denote filters that transmit red light, green light, and blue right, respectively. On the other hand, YC denote filters that transmit yellow light and cyan light, respectively.

FIG. 10A and FIG. 10B each show the minimum unit (4×4) of an array of color filters according to the present invention. The arrays of the color filters shown in FIG. 10A and FIG. 10B feature in that the G filters which are close to a luminance signal of the human eyes that directly relates to the resolution are arrayed in a checker shape, namely, the number of G filters is four times larger than the number of filters of each of other colors. In other words, the number of G filters is eight in 16 filters of the minimum unit, whereas the number of filters of each of the other colors is two. In FIG. 10A, low sensitivity rows (G, R, G, and B) and high sensitivity rows (C, G, Y, and G) are alternately arrayed in each line. If exposure time is varied in each line, signals can be read with a large dynamic range.

FIG. 10B shows an array of which each line and each row contain two G filters and the two other filters are a high sensitivity filter and a low sensitivity filter. Thus, in this array, there is little difference of luminances both in the horizontal direction and the vertical direction. Consequently, when the array shown in FIG. 10B is compared with that shown in FIG. 10B, although the former uses a complicated signal reading method, since it is advantageous for a spatial interpolation characteristic, it can easily accomplish smooth gradation.

Figure 11:
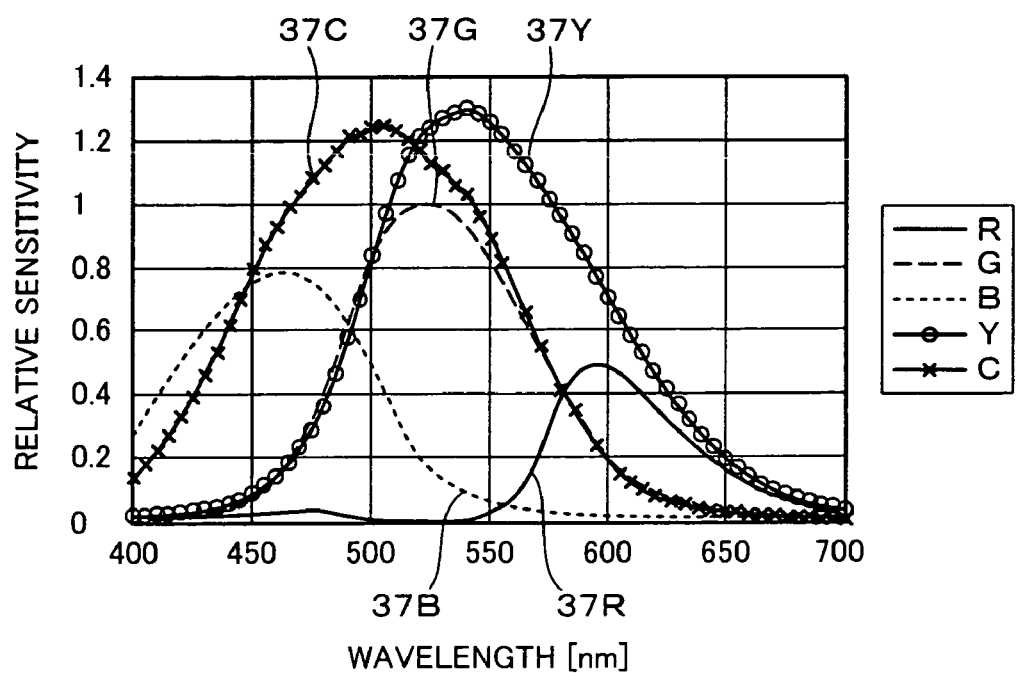
FIG. 11 is a graph showing spectral sensitivity of a hybrid RGBYC imaging device.

FIG. 11 is a graph showing spectral sensitivity of the hybrid RGBYC color filter. In FIG. 11, a curve 37Y denotes spectral sensitivity of a Y filter, a curve 37C denotes spectral sensitivity of a C filter, a curve 37R denotes spectral sensitivity of G filter, and a curve 37B denotes a B filter. As shown in FIG. 11, spectral sensitivity of each of colors Y and C of the complementary color system is higher than that of each of colors R, G, and B of the primary color system.

Figure 12:
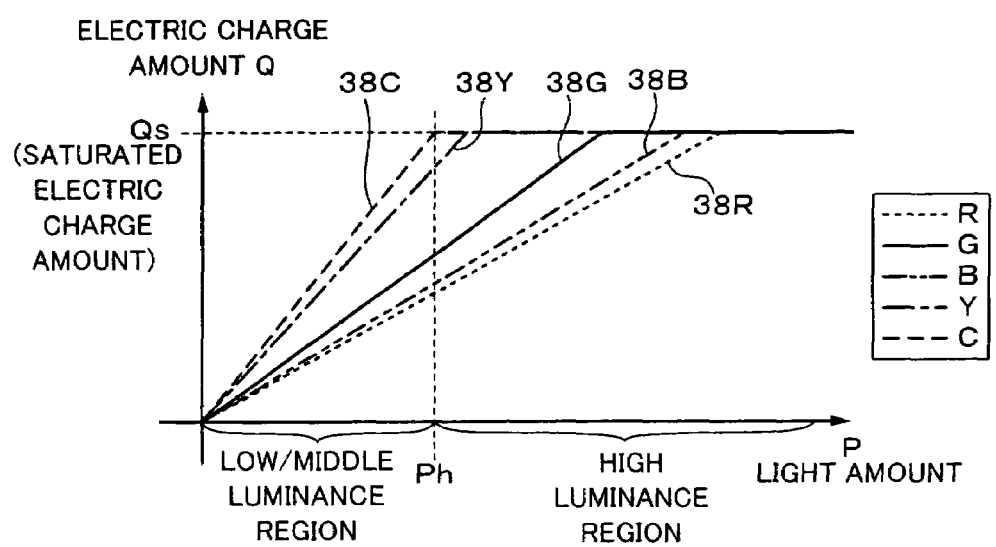
FIG. 12 is a schematic diagram describing a signal process using output signals of the hybrid RGBYC imaging device.

FIG. 12 shows the relationship between an electric charge amount Q and a light amount P stored in the imaging device for each color of the color filter. In FIG. 12, Qs denotes a saturated electric charge amount, 38C denotes [P-Q] characteristic of a C filter, 38Y denotes [P-Q] characteristic of a Y filter, 38R denotes [P-Q] characteristic of an R filter, 38G denotes [P-Q] characteristic of a G filter, 38B denotes [P-Q] characteristic of a B filter.

As shown in FIG. 12, a cell of each of a Y filter and a C filter having high sensitivity quickly stores required electric charge even if light amount is small. In contrast, a cell of each of a R filter and a B filter having low sensitivity is not quickly saturated with electric charge because the speed at which electric charge is stored is slow even if light amount that enters the cell is large. Using the difference of the characteristics of these cells, an image having a very large dynamic range can be captured.

For example, since a cell of a C filter is first saturated in five color filters, with a boundary of the light amount Ph for which electric charge is saturated in the cell of the C filter, a low/middle luminance region and a high luminance region are defined. Thus, when an image has luminance in the low/middle luminance region, signal values of five colors R, G, B, Y, and C are used. When an image has luminance in the high luminance region, since the cells of the Y and C filters are saturated with electric charge, signal values of three colors R, G, and B are used. Since color filters are switched corresponding to luminance of an image to be generated, it can always have a very wide dynamic range.

Luminance of an image can be determined corresponding to for example signal values of G, Y, and so forth, which are signal values of an imaging device and which contain a luminance component of the human eyes.

To calculate signal values of RGB of an image with signal values of the imaging device, a matrix calculating process is required. For example, the matrix calculating process for transforming signal values (Rin, Gin, Bin, Yin, Cin) of five colors of RGBYC into signal values (Rout, Gout, Bout) of a generated RGB image can be expressed by formula (3) with matrix coefficients of 3×5.

$$\begin{pmatrix} R_{out} \\ G_{out} \\ B_{out} \end{pmatrix} = \begin{pmatrix} m_0 & m_1 & m_2 & m_3 & m_4 \\ m_5 & m_6 & m_7 & m_8 & m_9 \\ m_{10} & m_{11} & m_{12} & m_{13} & m_{14} \end{pmatrix} \cdot \begin{pmatrix} R_{in} \\ G_{in} \\ B_{in} \\ Y_{in} \\ C_{in} \end{pmatrix} \quad (3)$$

Since the matrix coefficients of formula (3) are matrix calculation coefficients of linear signals, they are referred to as a linear matrix. For details about the method of determining the linear matrix, refer to Reference Document 3 (Takami Mizunaga, Naoya Katou, Kenichi Nishio, "Method of Evaluating Spectral Sensitivity of CCD Color Filter Considering Noise (Translated Title)", Journal of papers of Color Forum JAPAN 2003, pp. 29-32 (2003)).

Next, image data having different luminances will be described in detail.

In the case of low/middle luminance image data:

When signal values of R and B having low sensitivity become large, the influence of noise to the signals becomes small, and the signal values of Y and C are not saturated, signal values of all five colors of the hybrid imaging device can be used. Since the number of colors of the hybrid imaging device is larger than three colors of the primary color system, the hybrid imaging device has higher color separation characteristic than the primary color system. Thus, the hybrid imaging device can perform an excellent imaging process with respect to both color reproducibility and noise reduction.

In the case of high luminance image data:

When signal values of Y and C having high sensitivity are saturated, an image is generated with signal values of the remaining three colors R, G, and B. This state is the same as that state in which the primary color system three-color imaging device is used. Thus, the hybrid imaging device has color reproducibility and noise reduction in the same level as the primary color system three-color imaging device has.

Next, an imaging apparatus using the foregoing hybrid RGBYC imaging device, for example a digital still camera, will be described. However, the present invention is not limited to a still camera, but is applicable to a moving picture camera.

When the foregoing hybrid RGBYC imaging device is used in a camera, it has higher color reproducibility and noise characteristic than a camera that uses the primary color system three-color RGB imaging device and the complementary color system YCMG imaging device.

Next, according to the color filter evaluating method described in the foregoing Reference Document 3, a method of drawing a CN chart of the three imaging devices, which are the hybrid RGBYC imaging device, the primary color system three-color RGB imaging device, and the complementary color system YCMG imaging device, will be described briefly.

Figure 13:
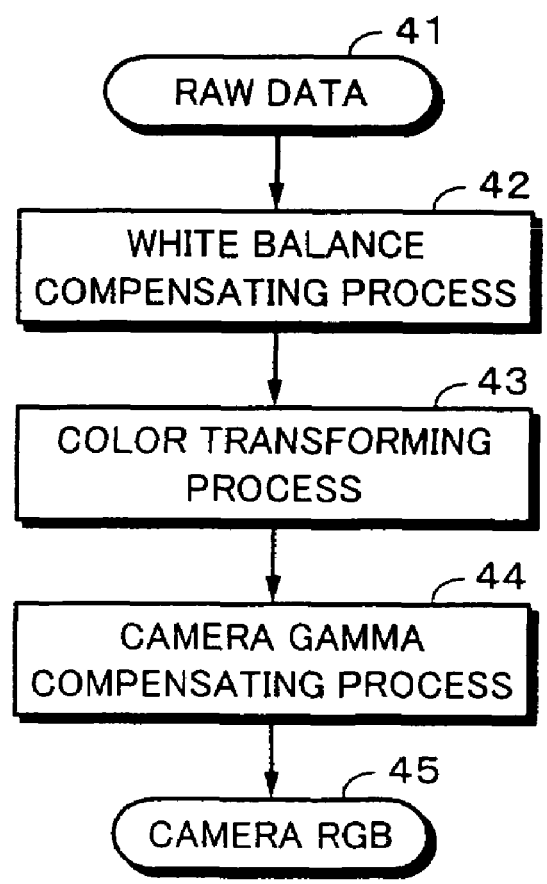
FIG. 13 is a flow chart showing a flow of a signal process according to the present invention.

Preconditions:

As imaging conditions, a standard light source D55 defined by CIE is used. As a target, a Macbeth color checker is used. A camera signal process shown in FIG. 13 is performed. Raw Data 41 are obtained as general characteristics of the digital still camera by integrating the product of the spectral sensitivity of the color filter of the imaging device, the spectral reflectance of a color patch of the Macbeth color checker, and the spectral radiation luminance of the imaging light source. In a white balance compensating process 42, the raw data 41 are multiplied by a gain so that the level of data of each of colors becomes equal to that of an achromatic color.

Thereafter, in a color transforming process 43, signal values linearly proportional to a luminance signal are approached to target colors by a matrix process. This process 43 corresponds to the linear matrix process. Hereinafter, this matrix is sometimes referred to as MAT. In the color transforming process 43, signal values become three colors R (Red), G (Green), and B (Blue). When the number of colors of the color filter is denoted by N, the white balance compensating process 42 becomes an N×N diagonal matrix calculating process. The color transforming process 43 becomes a 3×N matrix calculating process.

Figure 1:
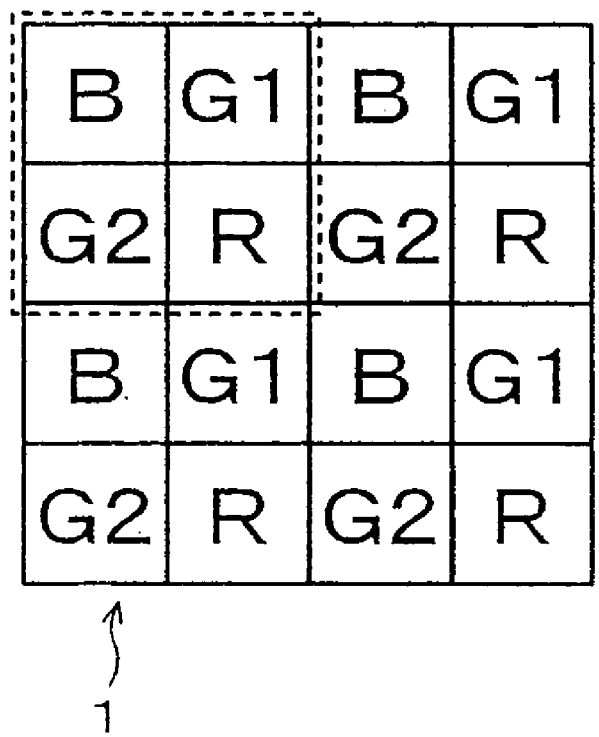
FIG. 1 is a schematic diagram showing an array of colors of a color filter of an imaging apparatus that has been proposed.
Figure 2A:
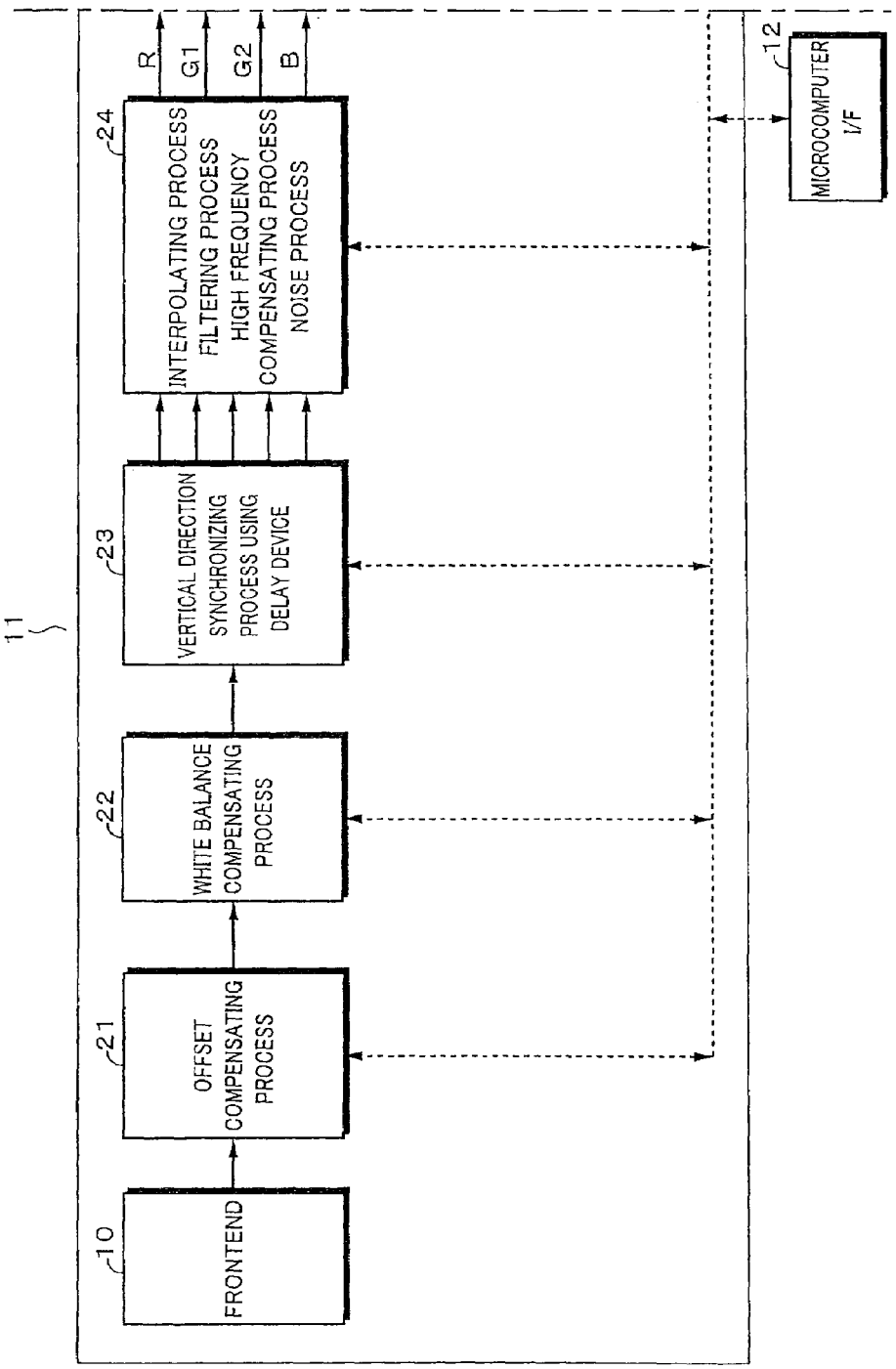
FIG. 2A and FIG. 2B are a block diagram showing a structure of a signal processing section of the imaging apparatus that has been proposed.
Figure 2B:
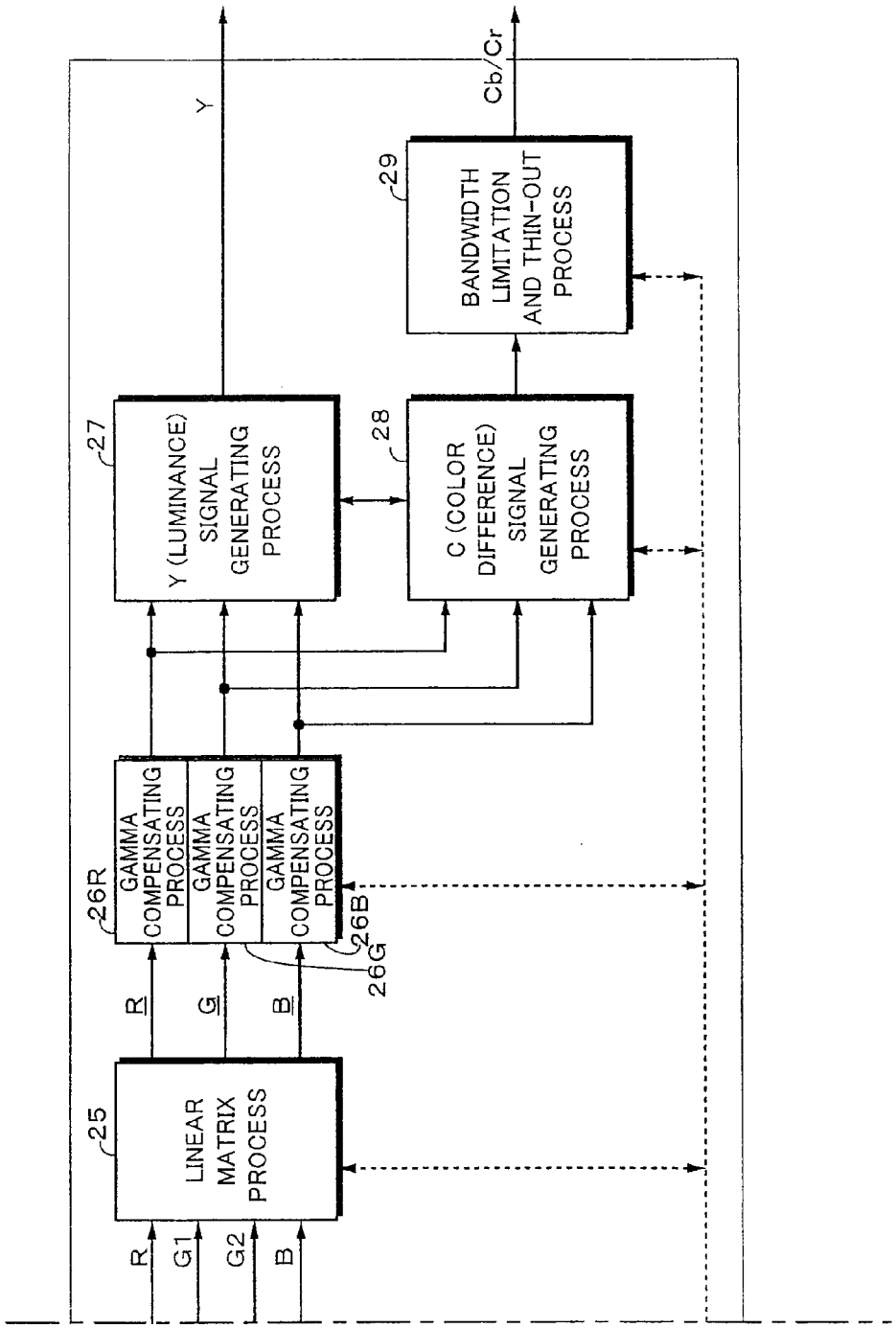
Figure 3:
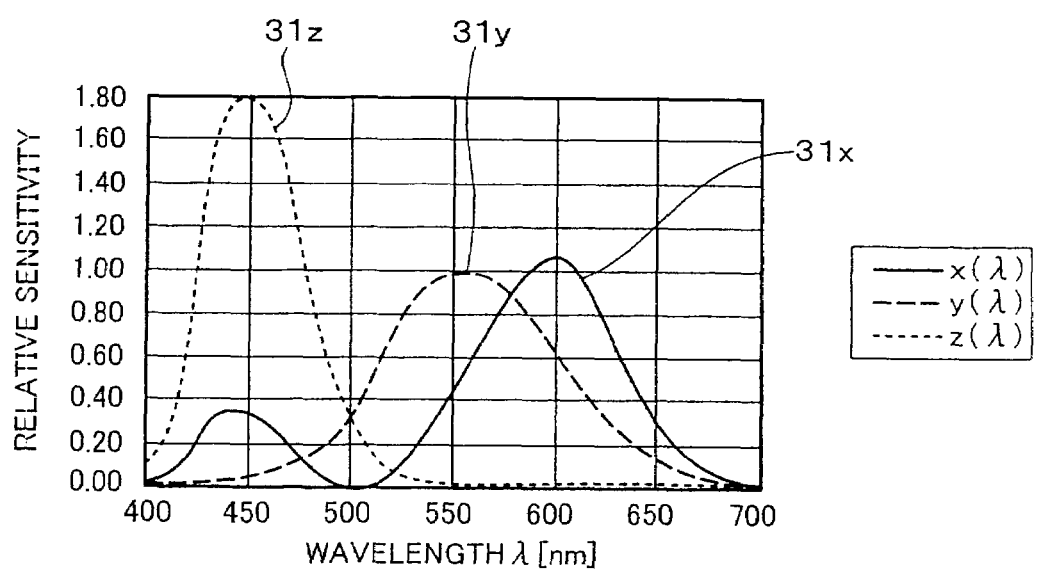
FIG. 3 is a graph showing an example of a color matching function.
Figure 4:
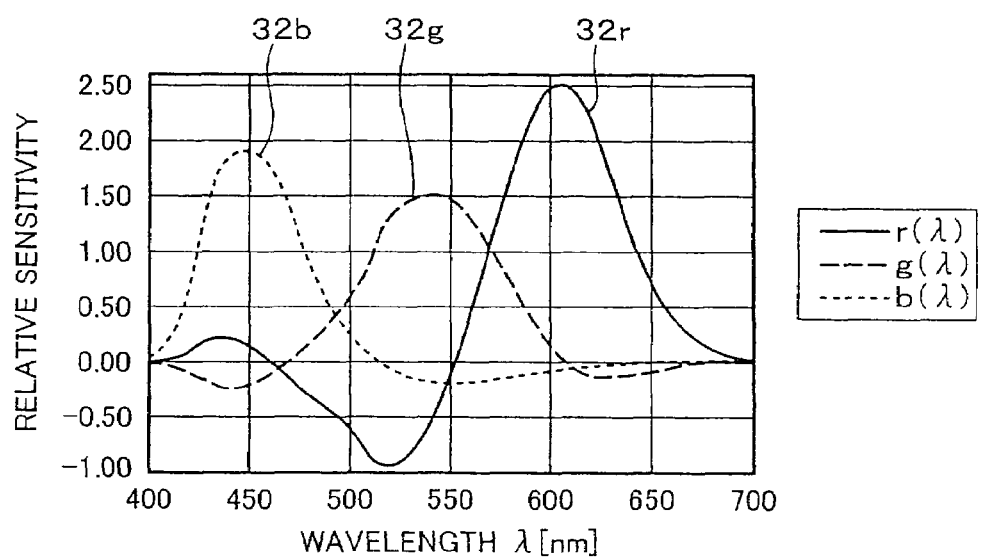
FIG. 4 is a graph showing an example of an sRGB color matching function.
Figure 5:
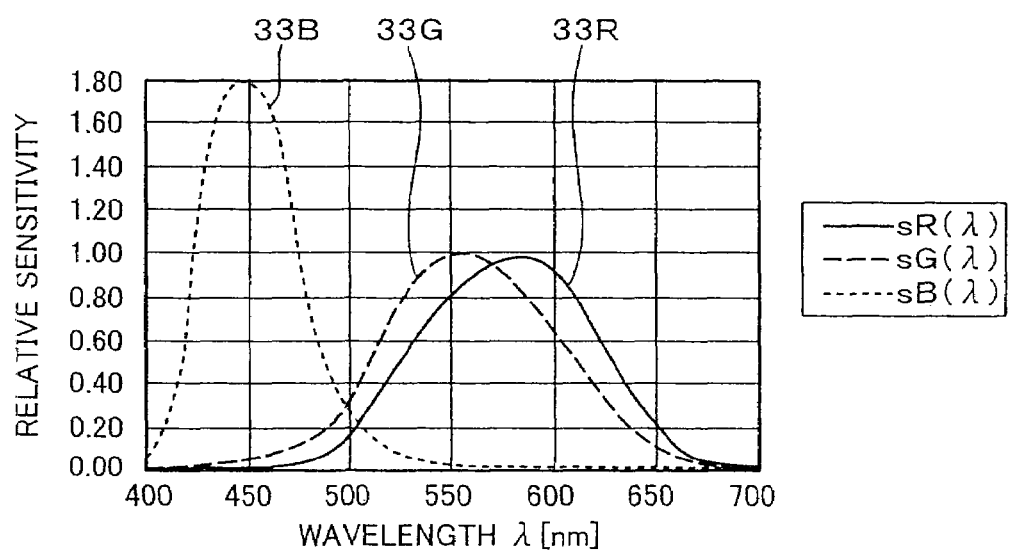
FIG. 5 is a graph showing spectral sensitivity of a three-color filter that satisfies the router condition.
Figure 6:
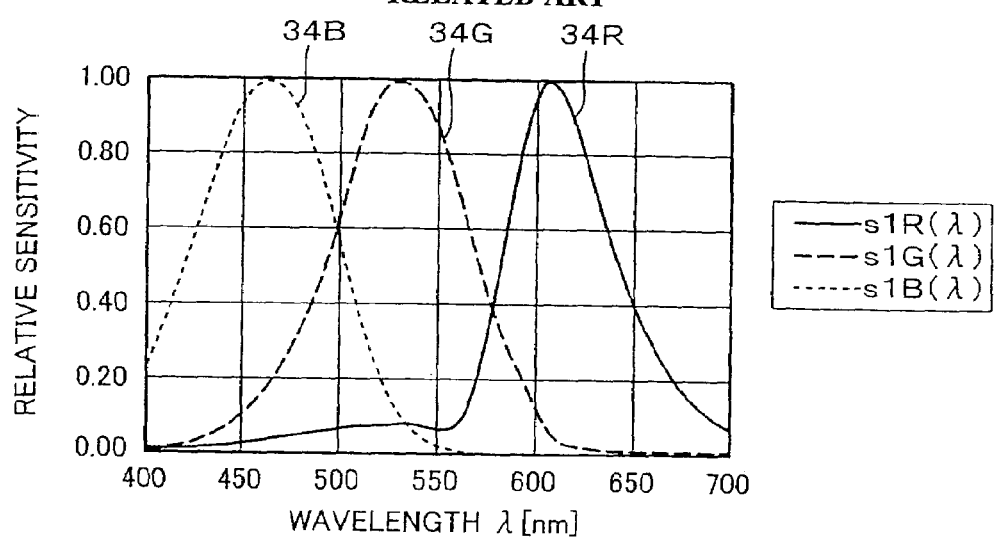
FIG. 6 is a graph showing spectral sensitivity of a conventional three-primary-color filter.
Figure 7:
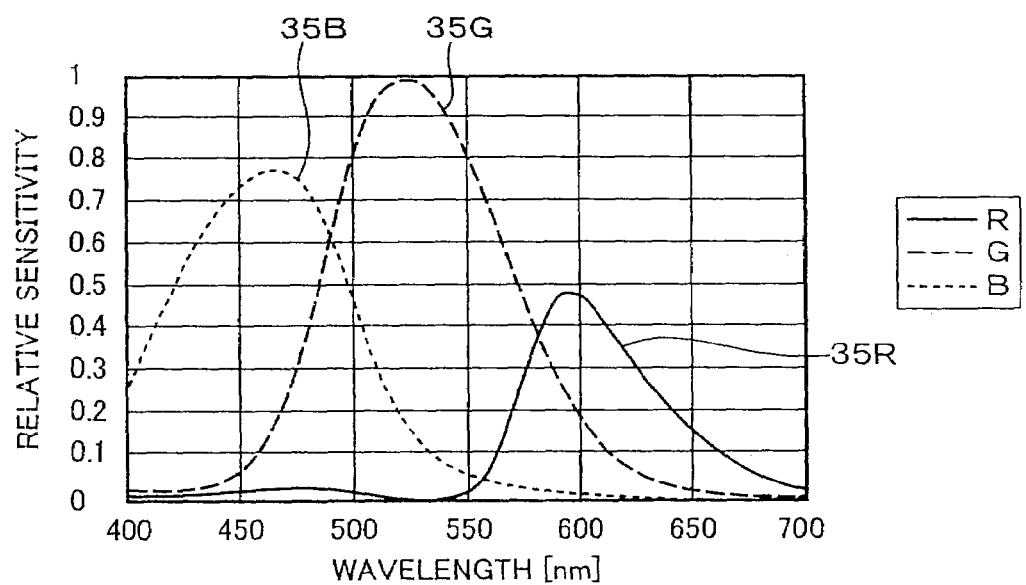
FIG. 7 is a graph showing spectral sensitivity of a primary color system RGB imaging device.
Figure 9:
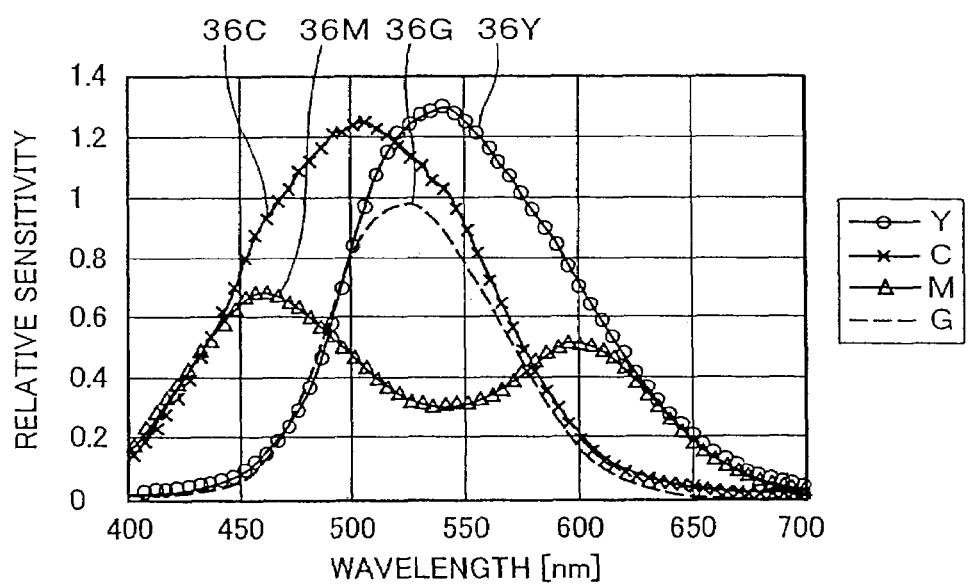
FIG. 9 is a graph showing spectral sensitivity of the complementary color system YCMG imaging device.

Finally, a gamma compensating process 44 is performed. As a result, camera RGB 45 are obtained as final outputs. However, in this example, inverted gamma characteristics of sRGB are used as camera gamma characteristics. The hardware of the digital still camera is the same as the structure of the signal process shown in FIG. 2A and FIG. 2B.

It is assumed that the camera RGB obtained in such a manner are reproduced by a standard sRGB monitor and observed. In other words, it is assumed that the camera RGB are colors of the sRGB color space. However, since the camera RGB also calculationally have values out of the sRGB range, it is considered not to clip the colors out of the range of the sRGB colors.

Definition of Color Reproduction Evaluation Index:

The color difference between the output signals of the camera and the human eyes is calculated as a delta E (ΔE) value. It is assumed that camera RGB are data of the sRGB color space, corresponding L*a*b* values, camera L*$^a$*b*, are calculated according to a flow chart showing FIG. 14 using a 709 type matrix $M_{709}$ or the like.

The L*a*b* values are a color space defined with three stimulus values of standard light. CIE proposed U*V*W* as a uniform color space in 1964 and L*$^u$*v* space that is a modification of the U*V*W* space in 1976. In addition, CIE proposed an L*a*b* space (CIELAB) as a color space corresponding to the color difference that is sensible in any color region in 1976.

Figure 14:
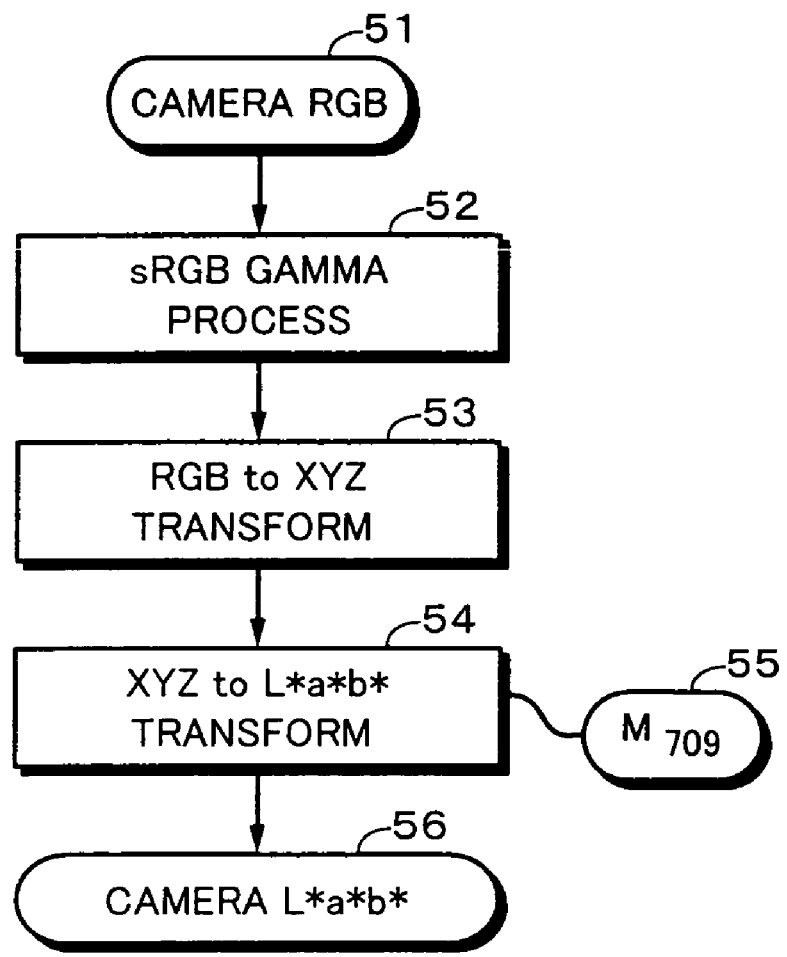
FIG. 14 is a flow chart showing a flow of a color transforming process according to the present invention.

In FIG. 14, after an sRGB gamma process 52 is performed for the camera RGB 51, a transforming process 53 is performed. In the transforming process 53, RGB are transformed into three stimulus values XYZ. In a transforming process 54, XYZ are transformed into L*a*b* using a 709 type matrix $M_{709}$ 55. As a result, camera L*$^{a}$*$^{b}$* 56 are finally obtained.

The 709 type matrix $M_{709}$ is described in Reference Document 1.

The L*a*b* values that that human eyes can see are calculated with the spectral reflectance of the Macbeth color checker and the spectral radiation luminance of the standard light source D55.

As an evaluation index of the color reproducibility, an average ΔE value (ΔEa) of 24 colors of the Macbeth color checker is used. This value becomes a function ΔEa (MAT) of MAT coefficients during a signal process of the camera as given by formula (4).

$$\Delta E_a(MAT) = \frac{1}{24}\int_{K=1}^{24} \Delta E_K(MAT) \tag{4}$$

where $\Delta E_k$: $\Delta E_k$ of k-th color patch; MAT: color transform matrix coefficients Definition of Noise Evaluation Index:

As a model of noise contained in output signals of the imaging device, formula (5) is used as a definition expression. This definition expression is described in Reference Document 4, (G. C. Holst, "CCD ARRAYS CAMERAS and DISPLAYS 2nd Ed.", JCD Publishing (1998)).

$$Noise\_raw = \sqrt{a_s \cdot CV_{\_CCD} + b_d} \tag{5}$$
$$= \sqrt{ShotNoise^2 + DarakNoise^2}$$

In formula (5), as described in Reference Document 5, (Kenichi Nishio, "Chromatics of CCD Camera (translated title)", Color Forum Japan '99, pp. 143-147 (1999)), $a_s$ and $b_d$ are values depending on device characteristics (saturated electron amount and so forth) of the CCD.

$a_s \cdot CV_{\_CCD}$ denotes optical shot noise, namely a noise component that depends on a signal value. $b_d$ denotes floor noise, namely a noise component that does not depend on a signal value (refer to Reference Document 4).

The noise Noise$_{\_raw}$ is propagated to various color spaces by the camera's signal process and L*a*b* transform. Next, a propagation model of noise will be outlined (refer to Reference Document 6, (P. D. Burns and R. S. Berns, "Error Propagation Analysis in Color Measurement and Imaging", Col. Res. Appl, Vol. 22, pp. 280-289 (1997)).

When input signals are linearly transformed into Y=[$y_1$, $y_2$, . . . , $y_m$]$^t$ with an (m×n) matrix A, the expression can be written as follows.

$$Y = A \cdot X \ldots$$

Now, it is assumed that a variance-covariance matrix of input signals X is given by formula (6).

$$\sum\nolimits_x = \begin{bmatrix} \sigma_1^2 & \sigma_{12} & \ldots & \sigma_{1n} \\ \sigma_{21} & \sigma_2^2 & \ldots & \sigma_{12} \\ \vdots & \vdots & \ddots & \vdots \\ \sigma_{n1} & \sigma_{n2} & \ldots & \sigma_n^2 \end{bmatrix} \tag{6}$$

The diagonal components of formula (6) are noise variance values of the input signal. If input signal values do not correlate, covariance components of matrix components (namely, non-diagonal components) become 0. At this point, a variance-covariance matrix of output signals Y is defined by formula (7).

$$\Sigma y = A \cdot \Sigma x \cdot A^t \tag{7}$$

Formula (7) is a logical propagation expression of noise variance values of color spaces linearly transformed therebetween.

To transform camera RGB values of the final output signals into L*a*b* values, as described in the definition of color reproducibility, when the XYZ space is transformed into the L*a*b* space, values are partly non-linearly transformed. However, since noise variant values are normally small, the XYZ-L*a*b* transform can be approximately expressed as a linear transform using a Jacobian matrix $J_{L^*{}_a{}^*{}_b}$ described in Reference Document 6. Thus, an approximate matrix $M_{total}$ with which original signals are linearly transformed into L*a*b* values is given by formula (8).

$$M_{total} = J_{L^*{}_a{}^*{}_b} \cdot M_{709} \cdot MAT \cdot WBM \quad (8)$$

where WBM: white balance matrix; MAT: color transform matrix

With the matrix given by formula (8) and the noise propagation theoretical expression given by formula (7), noise variant values of the final output signal values can be calculated by formula (9).

$$\sum L^* a^* b^* = \begin{pmatrix} \sigma_{L^*}^2 & \sigma_{L^*a^*} & \sigma_{a^*b^*} \\ \sigma_{a^*L^*} & \sigma_{a^*}^2 & \sigma_{L^*b^*} \\ \sigma_{a^*b^*} & \sigma_{b^*L^*} & \sigma_{b^*}^2 \end{pmatrix} \quad (9)$$

$$= M_{total} \cdot \Sigma_{RGBraw} \cdot M_{total}^t$$

With noise amounts $\sigma_L^*$, $\sigma_a^*$, and $\sigma_b^*$ obtained from formula (9), total noise values (TN values) defined by formula (10) are calculated. In addition, the average value TNa of TN values of patches of 24 colors of the Macbeth color checker is referred to as the noise evaluation index.

$$TN_a(MAT) = \frac{1}{24} \int_{k=1}^{24} TN_k(MAT) \quad (10)$$

where $TN_k$: TN value of k-th color patch; MAT: color transform matrix coefficients The TN values highly correlate with noise that the human eyes sense in consideration of both a luminance component and color components of the noise. The TN values are defined by the following formula with L*a*b noise amounts.

$$TN = \sqrt{\left(\frac{\sigma_{L^*}}{W_{L^*}}\right)^2 + \left(\frac{\sigma_{a^*}}{W_{a^*}}\right)^2 + \left(\frac{\sigma_{b^*}}{W_{b^*}}\right)^2} \quad (11)$$

In formula (11), $W_L^*$, $W_a^*$, and $W_b^*$ are weighting coefficients of noise amounts $\sigma_L^*$, $\sigma_a^*$, and $\sigma_b^*$, respectively. $W_L^*$, $W_a^*$, and $W_b^*$ are experimental and experience values obtained by visibility experiments.

Method of Deciding Parameters During Camera Signal Process:

Specifically, MAT coefficients are decided during a signal process. First, with a color reproduction evaluation index ΔEa and a noise evaluation index TNa, CEM (Comprehensive Error Metric) values are defined by formula (12).

$$CEM(MAT) = \sqrt{(wc \cdot \Delta E_a(MAT))^2 + (wn \cdot TN_a(MAT))^2} \quad (12)$$

where wc: weighting coefficient of color reproducibility; wn: weighting coefficient of noise amount When weighting coefficients wc and wn corresponding to the evaluation coefficients are decided and MAT coefficients that minimize the CEM values are obtained, a filter can be evaluated while color reproducibility and nose amount are adjusted.

Figure 15:
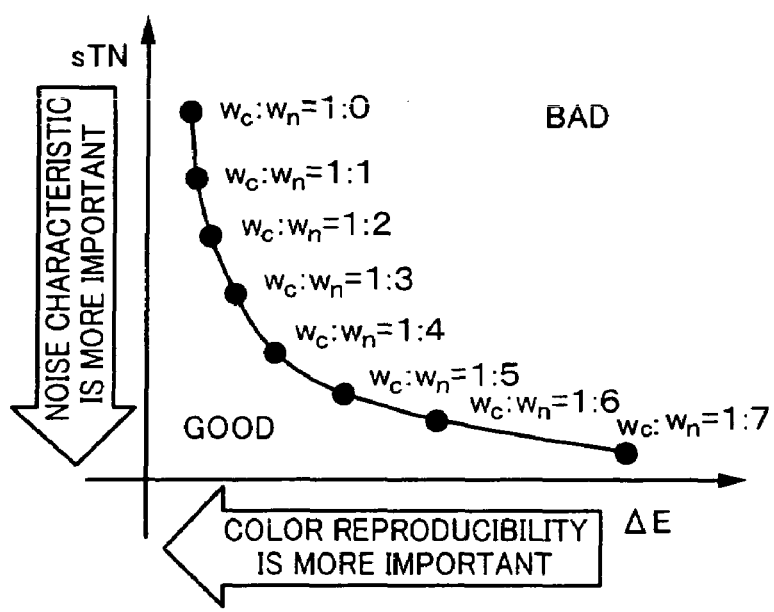
FIG. 15 is a graph showing a CN chart according to the present invention.

Method of Creating CN chart:

By varying wc and wn of the foregoing CEM values, MAT coefficients are calculated. With the calculated MAT coefficients, the color reproducibility evaluation index ΔEa and the noise evaluation index TNa are calculated. As shown in FIG. 15, the results are plotted so that the horizontal axis denotes ΔEa and the vertical axis denotes TNa as [color reproducibility versus noise] (hereinafter this plot chart is sometimes referred to as the CN chart). The CN chart denotes the capability of a color filter set to be evaluated.

A lower left region of FIG. 15 denotes a region in which both color reproducibility and noise characteristic are good. An upper right region of FIG. 15 is a region in which both color reproducibility and noise characteristic are bad. Thus, the more the plot is close to the lower left region, the higher the performance of the filter set is. When each filter set to be evaluated is plotted and compared, it can be intuitively determined which of filter sets is excellent. Generally, the locus of the CN chart is a curve of which the lower left region is convexed. Thus, when the color reproducibility is good, the noise characteristic is bad. When the noise characteristic is good, the color reproducibility is bad. In other words, the color reproducibility and the noise characteristic have the relationship of a tradeoff.

Figure 16:
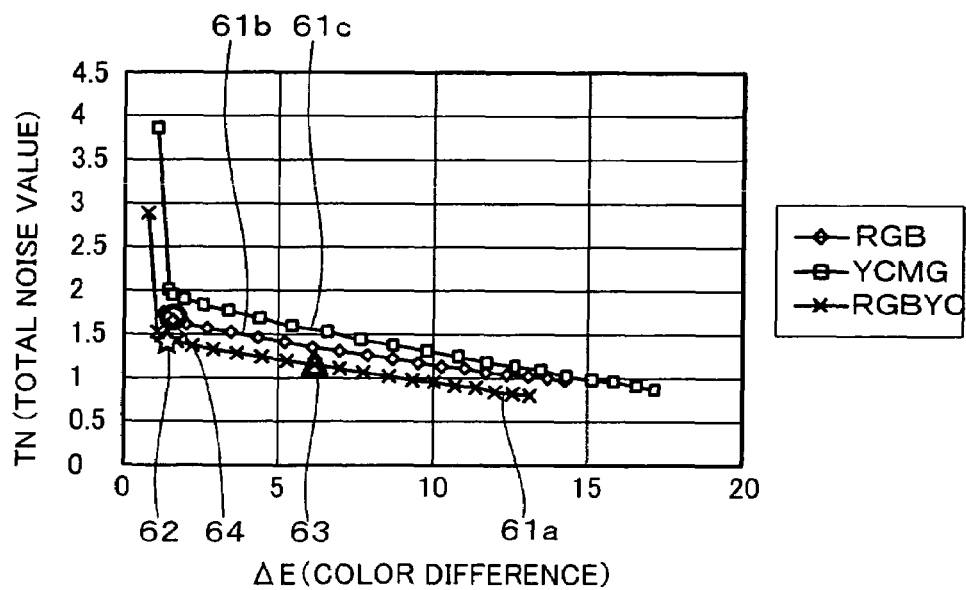
FIG. 16 is a graph showing the comparison of CNs of a hybrid RGBY imaging device, a primary color system imaging device, and a complementary color system imaging device.

FIG. 16 is a CN chart of the hybrid imaging device according to the present invention, the primary color system three-color imaging device, and the complementary color system four-color imaging device. Reference numeral 61a denotes a plot of [color reproducibility versus noise characteristic] of the hybrid imaging device. Reference numeral 61b denotes a plot of [color reproducibility versus noise characteristic] of the primary color system three-color imaging device. Reference numeral 61c denotes a plot of [color reproducibility versus noise characteristic] of the complementary color system four-color imaging device.

Since the lower left region of the CN chart shown in FIG. 16 is a region in which both the color reproducibility and noise characteristic are good. Thus, an imaging device that is plotted at the most lower left position on the locus of the CN chart has excellent characteristics. As is clear from FIG. 16, since the plot 61a of the hybrid imaging device is at the most lower left position, the hybrid imaging device is superior to the primary color system imaging device and the complementary color system imaging device in both color reproducibility and noise characteristic.

Actually, RGBYC imaging devices having the arrays shown in FIG. 10A and FIG. 10B are produced and an IC (Integrated Circuit) that performs the signal process shown in FIG. 13 is produced. In the gamma compensating process, RGB output signals are calculated with the sRGB gamma characteristics. As linear matrix coefficients, weighting coefficients of for example wc:wn=1:3 denoted by ☆62 of the CN chart (FIG. 16) are used. Coefficients of ☆ are given by formula (13).

$$\begin{pmatrix} R_{out} \\ G_{out} \\ B_{out} \end{pmatrix} = \begin{pmatrix} 1.494 & -0.836 & 0.242 & 0.658 & -0.559 \\ -0.255 & 0.688 & -0.383 & 0.706 & 0.244 \\ 0.094 & -0.403 & 1.245 & -0.351 & 0.406 \end{pmatrix} \cdot \begin{pmatrix} R_{in} \\ G_{in} \\ B_{in} \\ Y_{in} \\ C_{in} \end{pmatrix} \quad (13)$$

Formula (13) reveals that coefficient values are small and color separation noise does not largely increase. Thus, a camera having a five-color RGBYC imaging device can be accomplished.

Next, an image inputting apparatus that uses the hybrid imaging device and that can capture an image having a wide dynamic range will be described.

By selecting signal levels of five colors corresponding to the luminance levels of pixel values, an image having a wide dynamic range can be scanned. Next, an example of this operation will be described.

Although there may be various methods of calculating a luminance level of a pixel value, for example, a G signal similar to a luminance component that the human eyes sense is used as a luminance value. The signal process shown in FIG. 17 may be used. LM (H) 71, LM (M) 72, and LM (L) 73 denote linear matrix processes for high luminance, middle luminance, and low luminance, respectively. WB (H) 74, WB (M) 75, and WB (L) 76 each denote a white balance process. Reference numerals 77, 78, and 79 denote multiplying devices that multiply output signals by gain values a, b, and c, respectively.

Figure 17:
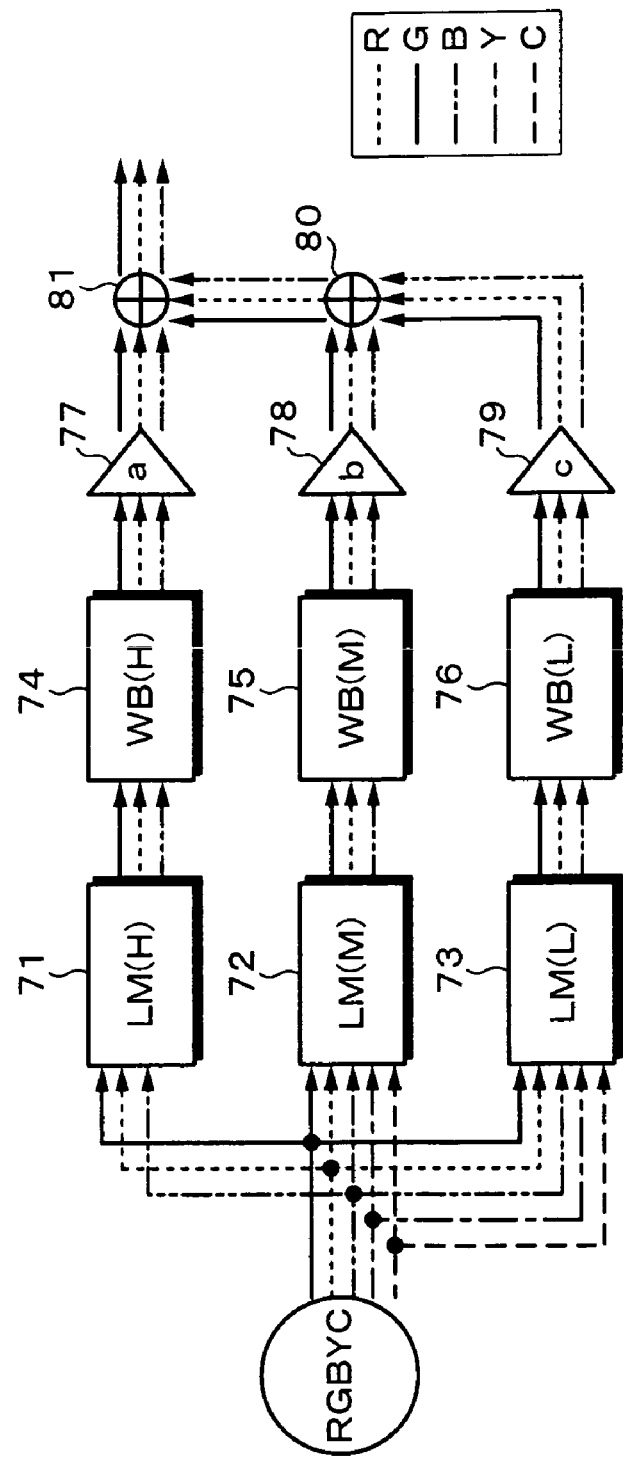
FIG. 17 is a block diagram showing an example of a signal process according to an embodiment of the present invention.
Figure 18:
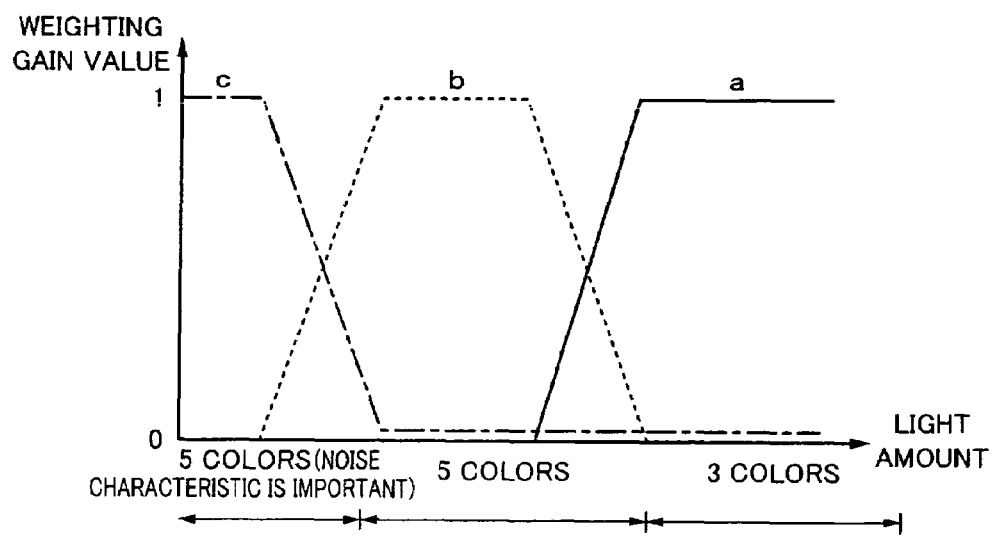
FIG. 18 is a schematic diagram showing an example of a transition of weighting gain coefficients during a signal process.

FIG. 18 shows a transition of weighting gain coefficients corresponding to variation of a luminance level (horizontal axis). In the high luminance region, the gain coefficients are (a=1, b=c=0). In the middle luminance region, the gain coefficients are (a=0, b=1, c=0). In the low luminance region, the gain coefficients are (a=b=0, c=1). In the vicinity of the boundary of each region, a gain coefficient that decreases and another gain coefficient that decreases intersect. Thus, their variations are not obstructive. A gain coefficient controlling section that controls gain coefficients in a luminance level (for example, a G signal) of each sample of which for example RGBYC signals have been A/D (analog-digital) converted is disposed (not shown in FIG. 17).

With reference to Reference Document 3, linear matrix coefficients in each luminance level are designated.

Low Luminance Region:

In the low luminance region, noise reduction is more important factor than color reproducibility from a view point of picture quality. Thus, as linear matrix coefficients, coefficients emphasizing noise characteristic are used with signal values of five colors of RGBYC. For example, coefficients corresponding to the point of wc:wn=1:10 (the position of a Δ mark 63 in FIG. 16) may be used. The coefficient values are given by the following formula.

$$\begin{pmatrix} R_{out} \\ G_{out} \\ B_{out} \end{pmatrix} = \begin{pmatrix} 1.147 & -0.562 & 0.104 & 0.731 & -0.419 \\ -0.155 & 0.531 & -0.210 & 0.544 & 0.289 \\ 0.082 & -0.344 & 1.210 & -0.405 & 0.457 \end{pmatrix} \cdot \begin{pmatrix} R_{in} \\ G_{in} \\ B_{in} \\ Y_{in} \\ C_{in} \end{pmatrix} \quad (14)$$

Since the weight for noise in formula (14) is larger than those in formula (13), the absolute values of coefficients of the former are smaller than those of the latter. Thus, it is clear that color separation noise does not increase.

Middle Luminance Region:

Linear matrix coefficients for an middle luminance pixel are decided at a point of which color reproducibility and noise characteristic are best balanced using signal values of five colors of RGBYC. In other words, coefficients at the most lower left position on the curve of the CN chart are decided. Matrix coefficients that satisfy for example wc:wn=1:3 shown in formula (13) may be decided.

High Luminance Region:

Since a Y signal and a C signal are much saturated, linear matrix coefficients for a high luminance pixel are decided at a point of which color reproducibility and noise characteristic are best balanced using signal values of three colors of RGB. In other words, coefficients at the most lower left position on the locus of the CN chart are decided. Coefficients at the point that satisfies for example wc:wn=1:3 (at the position of an O mark 64 in FIG. 16) may be decided. The coefficients are given by formula (15).

$$\begin{pmatrix} R_{out} \\ G_{out} \\ B_{out} \end{pmatrix} = \begin{pmatrix} 1.659 & -0.654 & -0.005 \\ -0.080 & 1.396 & -0.316 \\ 0.008 & -0.457 & 1.449 \end{pmatrix} \cdot \begin{pmatrix} R_{in} \\ G_{in} \\ B_{in} \end{pmatrix} \quad (15)$$

The process is performed as follows.

When a signal of a pixel is input, a signal value corresponding to a luminance level is calculated through three types of linear matrix processes (LM (H) 71, LM (M) 72, and IM (L) 73 shown in FIG. 17) corresponding to the input signal value.

The signal value is multiplied by predetermined gain coefficients (a, b, and c) shown in FIG. 18 corresponding to the luminance level of the pixel through white balance processes (WB (H) 74, WB (M) 75, and WB (L) 76 shown in FIG. 17) (multiplying devices 77, 78, and 79 shown in FIG. 17).

Thereafter, three types of output signals are added by adding devices 80 and 81 shown in FIG. 17. As a result, an output signal value of the pixel is decided.

The boundary of the low luminance level and the middle luminance level may be for example a boundary of ISO 400 and ISO 200. The boundary of the middle luminance level and the high luminance level may be the case of which one of the Y signal and the C signal is saturated.

An embodiment of the present invention has been specifically described. However, the present invention is not limited to the embodiment. Instead, various modifications of the present invention may be made on the basis of the spirit of the present invention. For example, in the structure shown in FIG. 17, different matrix calculating processes are performed for three luminance levels. Instead, different matrix calculating processes may be performed for two (low/middle luminance level and high luminance level). In addition, three colors of YCG may be used for the low luminance level, whereas five colors of RGBYC may be used for the middle luminance level. In addition, the present invention may be applied for a device made of three CMOS layers that are a blue sensitive layer, a green sensitive layer, and a red sensitive layer like a color film.

DESCRIPTION OF REFERENCE NUMERALS 37C, 37Y SPECTRAL SENSITIVITIES OF CYAN AND YELLOW FILTERS
37R, 37G, 37B SPECTRAL SENSITIVITIES OF RED, GREEN, AND BLUE FILTERS
42 WHITE BALANCE COMPENSATING PROCESS
43 COLOR TRANSFORMING PROCESS
44 CAMERA GAMMA COMPENSATING PROCESS
52 sRGB GAMMA PROCESS
53 RGB TO XYZ TRANSFORMING PROCESS
54 XYZ TO L*a*b* TRANSFORMING PROCESS
61a PLOT OF [COLOR REPRODUCIBILITY VERSUS NOISE CHARACTERISTIC] OF HYBRID IMAGING DEVICE
61b PLOT OF [COLOR REPRODUCIBILITY VERSUS NOISE CHARACTERISTIC] OF PRIMARY COLOR SYSTEM THREE-COLOR IMAGING DEVICE

61c PLOT OF [COLOR REPRODUCIBILITY VERSUS NOISE CHARACTERISTIC] OF COMPLEMENTARY COLOR SYSTEM FOUR-COLOR IMAGING DEVICE
71 LINEAR MATRIX PROCESS FOR HIGH LUMINANCE
72 LINEAR MATRIX PROCESS FOR MIDDLE LUMINANCE
73 LINEAR MATRIX PROCESS FOR LOW LUMINANCE
77, 78, 79 MULTIPLYING DEVICES WHICH MULTIPLY GAIN COEFFICIENTS a, b, AND c

The invention claimed is:

1. An imaging apparatus comprising:
 an imaging section having a three primary color system color separation filter and a complementary color system color separation filter; and
 a signal processing section configured to generate three primary color signals by performing matrix calculation process for output signals of the imaging section obtained by using both, the three primary color system color separation filter and the complementary color system color separation filter, when a luminance level of an image obtained by the imaging section is a first luminance region, and to generate three primary color signals by performing matrix calculation process for the output signals of the imaging section obtained by using only the three primary color system color separation filter when the luminance level of the image obtained by the imaging section is a second luminance region, which is higher than the first luminance region.

2. The imaging apparatus as set forth in claim 1,
 wherein the three primary color system color separation filter includes a R (red) filter, a G (green) filter, and a B (blue) filter, and the complementary color system color separation filter includes a Y (yellow) filter and a C (cyan) filter.

3. The imaging apparatus as set forth in claim 1, wherein the signal processing section includes
 a first matrix calculation section configured to generate the three primary color signals by using a first matrix coefficients of which good noise characteristic when the luminance level of the image is lower than a predetermined boundary within the first luminance region, and
 a second matrix calculation section configured to generate the three primary color signals by using a second matrix coefficients of which color reproducibility and noise characteristic are well balanced in the second luminance region.

4. The imaging apparatus as set forth in claim 1, wherein the boundary of the first and second luminance regions is selected in a luminance level of which the imaging device is saturated through the complementary color system color separation filter.

5. The imaging apparatus as set forth in claim 1, wherein the signal processing section is configured to generate the three primary color signals by using a first matrix coefficients of which good noise characteristic when the luminance level of the image is lower than a predetermined boundary within the first luminance region, and to generate the three primary color signals by using a second matrix coefficients of which color reproducibility and noise characteristic are well balanced in the second luminance region.

6. An image processing apparatus for processing output signals of an imaging device having a three primary color system color separation filter and a complementary color system color separation filter, said image processing apparatus comprising:
 a signal processing section configured to generate three primary color signals by performing matrix calculation process for output signals of the imaging device obtained by using both, the three primary color system color separation filter and the complementary color system color separation filter, when luminance level of an image obtained by the imaging device is a first luminance region, and to generate three primary color signals by performing matrix calculation process for the output signals of the imaging device obtained by using only the three primary color system color separation filter when luminance level of the image obtained by the imaging device is a second luminance region, which is higher than the first luminance region.

* * * * *